(12) United States Patent
Fourie et al.

(10) Patent No.: US 6,956,850 B1
(45) Date of Patent: Oct. 18, 2005

(54) CALL RECORD MANAGEMENT FOR HIGH CAPACITY SWITCHED VIRTUAL CIRCUITS

(75) Inventors: Henry Fourie, Los Gatos, CA (US); Snehal G. Karia, Freemont, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/276,248

(22) Filed: Mar. 25, 1999

(51) Int. Cl.$^7$ .............................................. H04L 12/50
(52) U.S. Cl. ...................... 370/360; 370/229; 370/360; 370/410; 370/522; 379/32.01; 379/115.01; 379/121.03; 379/121.05; 379/126
(58) Field of Search ................................ 370/235, 236, 370/236.1, 236.2, 395.1, 360, 410, 522, 229, 370/230; 379/32.01–32.05, 112.01–133

(56) References Cited

U.S. PATENT DOCUMENTS

| | | | |
|---|---|---|---|
| 4,626,624 A | | 12/1986 | Daisenberger |
| 4,788,719 A | * | 11/1988 | Gupta ........................ 379/114 |
| 5,067,074 A | | 11/1991 | Farel et al. |
| 5,218,632 A | * | 6/1993 | Cool .......................... 379/126 |
| 5,295,183 A | | 3/1994 | Langlois et al. |
| 5,313,454 A | | 5/1994 | Bustini et al. |
| 5,359,592 A | | 10/1994 | Corbalis et al. |
| 5,394,534 A | * | 2/1995 | Kulakowski et al. ....... 711/112 |
| 5,473,604 A | | 12/1995 | Lorenz et al. |
| 5,511,113 A | * | 4/1996 | Tasaki et al. .......... 379/114.28 |
| 5,519,690 A | | 5/1996 | Suzuka et al. |
| 5,706,330 A | * | 1/1998 | Bufferd et al. .............. 455/405 |
| 5,757,781 A | * | 5/1998 | Gilman et al. .............. 370/260 |
| 5,764,750 A | * | 6/1998 | Chau et al. ................. 379/229 |
| 5,867,562 A | * | 2/1999 | Scherer ................... 379/88.21 |
| 5,907,603 A | * | 5/1999 | Gallagher et al. .......... 379/133 |
| 5,999,604 A | * | 12/1999 | Walter ........................ 379/133 |
| 6,018,519 A | | 1/2000 | Ginzboorg |
| 6,052,448 A | * | 4/2000 | Janning ................. 379/115.01 |
| 6,092,071 A | * | 7/2000 | Bolan et al. ................. 707/101 |
| 6,175,896 B1 | * | 1/2001 | Bui ............................ 711/118 |
| 6,282,267 B1 | * | 8/2001 | Nolting ................... 379/32.03 |
| 6,317,433 B1 | * | 11/2001 | Galand et al. ........... 370/395.2 |
| 6,356,629 B1 | | 3/2002 | Fourie et al. |
| 6,385,301 B1 | * | 5/2002 | Nolting et al. ........... 379/32.01 |
| 6,714,979 B1 | * | 3/2004 | Brandt et al. ............... 709/225 |

OTHER PUBLICATIONS

Mito, M., et al., "B-IDSN Signaling Protocol Processing For Large Multiplexed Subscriber System", 1995 IEEE International Conference on Communications, Converging Technologies for Tomorrow's Applications. ICC'96. Proceedings of ICC/SUPERCOM '96-International Conference on Communications, Dallas, TX, USA.

Michibaru Mito, Miki Hirano, "B-ISDN Signaling Protocol Processing For Large Multiplexed Subscriber System", NTT Network Services Systems Laboratories, 1995 IEEE International Conference on Communications, Converging Technologies for Tomorrow's Applications. ICC '96. Proceedings of ICC/SUPERCOMM '96,-International Conference on Communications, Dallas, TX, USA. PP 663-688. vol. 2, XP002140624, 1996.

* cited by examiner

Primary Examiner—Brian Nguyen
Assistant Examiner—Tri H. Phan
(74) Attorney, Agent, or Firm—Blakely, Sokoloff, Taylor & Zafman LLP (57) ABSTRACT

A resource management strategy for a network controller device such as an SVC (Switched Virtual Circuit) controller that interprets and processes call messages transported in a connection-oriented network by means of high-capacity switching devices. The call record of given call is compressed or expanded depending upon the transition in phase that a call is undergoing, if any. The strategy is applicable to both point-to-point and point-to-multi-point calls.

86 Claims, 5 Drawing Sheets

POINT-TO-POINT CALL

POINT-TO-MULTI-POINT CALL

CALL RECORD MANAGEMENT FOR HIGH CAPACITY SWITCHED VIRTUAL CIRCUITS

FIELD OF THE INVENTION

The invention relates generally to communications and networking. More specifically, the invention relates to the usage of resources in networking devices.

BACKGROUND OF THE INVENTION

In connection-oriented networking schemes such as ATM (Asynchronous Transfer Mode), connections or "calls" must be established between one information device such as a computer system or router and another. This call or connection is sometimes referred to as a "virtual circuit" (VC) particularly where a specified data pipe is artificially, through software, segmented into separate data-pathways, each pathway servicing a particular VC. Often a switch acts as an intermediary to direct one or more of these VCs through a particular network node, and thus these calls are collectively referred to as SVCs (Switched Virtual Circuits).

Figure 1:
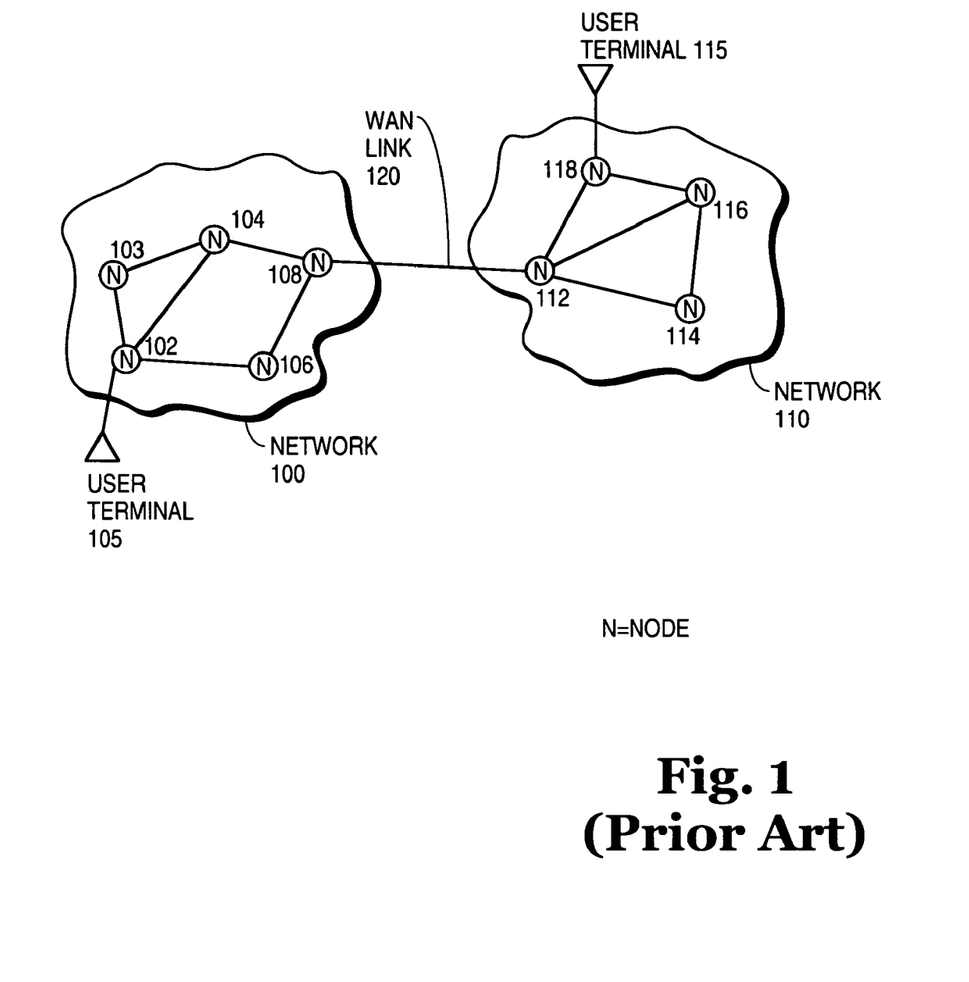
FIG. 1 illustrates a prior art exemplary networking topology.

FIG. 1 shows an exemplary wide-area networking system serviced by ATM. A wide-area network (WAN) link 120 interconnects a first network 100 with a second network 110. Each network has a plurality of nodes that may each contain switching devices that regulate data traffic to one or more user terminals. Network 100 is shown having nodes 102, 103, 104, 106, and 108, while network 110 is shown having nodes 112, 114, 116, and 118. A first user terminal 105 is connected to node 102 of network 100 while a second user terminal 115 is connected to node 118 of network 110. In order for user terminal 105 and user terminal 115 to communicate with one another, a call must first be established between them. This call may be switched through a plurality of nodes. One possible route for sending data from user terminal 105 to user terminal 115 is for data to go from node 102 to node 106 to node 108 and then across the WAN link to node 112 and node 118 finally reaching user terminal 115. Each node has a controller device (SVC controller) and switch which facilitates the calls through its node. The SVC controller has processing, memory and other resources to interpret, forward and process messages and initiate other messages as appropriate, while the switch ordinarily handles the physical routing of messages among nodes and user terminals.

Similar to PSTN (Public Switched Telephone Network) communications such as telephone calls, the period of SVC call operation for a given call can be split into three distinct phases-establishment (setup), active (data transfer), and disconnect (hang-up). Once a call is established, for example, between user terminal 105 and user terminal 115 across a specified path, a virtual circuit will have been created and the call can proceed into the active phase where data is transferred. Once the data transfer is complete, the call can be disconnected, which will release the virtual circuit. State, signaling, and other information for each call that passes through a network node is memorialized in a "call record" stored in the that node whether that node is the source, an intermediary, or destination node. The call record is updated whenever a change in state or activity in the call is indicated. The call record may be used for functions such as billing, tracing, routing, etc.

Ordinarily the creation, storage, updating and retrieval either in whole or part by the SVC controller device within the node. The capacity (number of supportable connections or calls) of the switching device connected to the SVC controller dictates the resources needed for call record handling at the SVC controller. Recently switches such as carrier-class ATM backbone switches have been developed to handle in the hundred thousands to millions of connections, thus forcing SVC controllers to be designed to scale-up accordingly. For instance, if a call record is 1 KiloByte, then 1,000,000 call records would require a controller memory/storage capacity of 1 GigaByte. Such a demand for memory on an SVC leads to increased costs in new SVCs and upgrade difficulty if existing SVCs are used with high-capacity switches.

This expense and difficulty is increased substantially because of an industry standard that demands a service availability of 99.999%. A switching node must have a service outage of no more than 3 minutes per year. To prevent against power failure/system reset, the memory used must be non-volatile (or a redundant controller unit should be hot-standby available) and further, must be protected by a Memory Management Unit (MMU) to prevent wild pointer writes and other memory failures/errors. MMU-protected memory is expensive. If a standby controller is used with a volatile memory, the bandwidth required to transfer call records from the active controller to the standby controller can be prohibitive. In either case, whether using expensive non-volatile memory or using a redundant standby controller, the providing of resources becomes critical to cost and design.

SUMMARY OF THE INVENTION

What is disclosed is a method of managing resources in a network controller connecting to a plurality of interfaces comprising recognizing a transition in the phase of a call transported through the controller, and the size of the call record of said call in accordance with the type of phase transition recognized.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicated similar elements and in which.

DETAILED DESCRIPTION

A resource management strategy is described for a network controller device such as an SVC (Switched Virtual Circuit) controller that interprets and processes call messages transported in a connection-oriented network by means of high-capacity switching devices. As will be described in greater detail below, the call record of given call is compressed or expanded depending upon the transition in phase that a call is undergoing, if any. The strategy is applicable to both point-to-point and point-to-multi-point calls.

Figure 2:
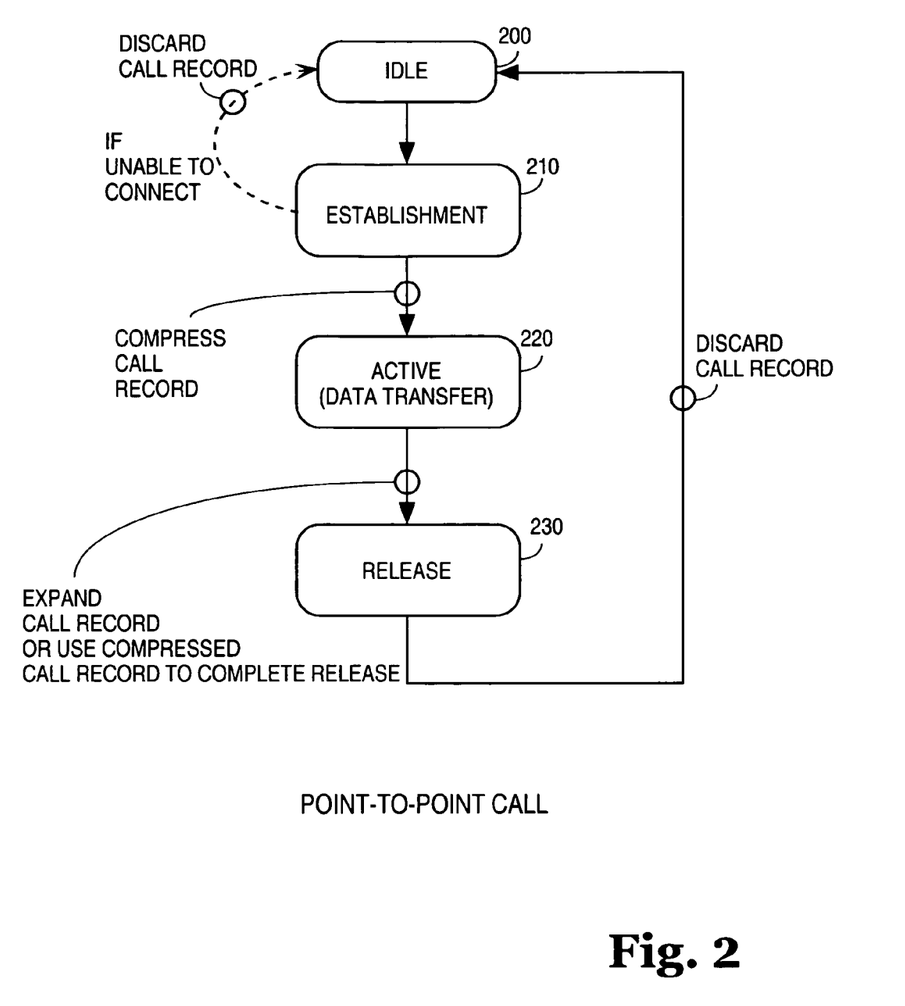
FIG. 2 illustrates the operation of a connection-oriented network point-to-point call with call record management.

FIG. 2 illustrates the operation of a connection-oriented network point-to-point call with call record management.

A "point-to-point" call is a call between two and only parties, and has three phases-establishment, active and release. For a given point-to-point call, before the call is established, the call is said to be in an idle state 200. The establishment phase 210 begins with the receipt of a Call Setup message at a particular node. The establishment phase also commences the formation of a new call record for that call as it passes that particular node. Thus, a call that has to traverse through five nodes before being connected would have five call records associated with it, one at the controller of each node. When a call is connected (established) successfully, then that call is in the active phase 220. As such, the call is no longer "in progress," but rather has been fully established. If a call is unable to connect, then the call transitions directly back to idle state 200 from establishment phase 210. For example a destination busy signal would end the establishment phase 210 and, thus trigger the idle state before the call reaches the active phase. In this instance, the call record is fully discarded.

If a call is in the active phase 220, the transfer of user data (rather than just control/signaling data) can occur until a release (hang-up) is completed. When the call transitions from the establishment phase 210 to the active phase 220, the call record at each node that the call has passed through is updated in selected fields. Certain other fields, which the call record needed to preserve during establishment phase 210, are not needed during the active phase. According to an embodiment of the invention, the call record is compressed by discarding such information when a call reaches the active phase.

When a call completes its data transfer or is disconnected prematurely by accident or design, the active phase 220 is terminated and the call transitions to a release phase 230. The release phase 230 must be completed before the call is considered to be in the idle state 200 and ordinarily this requires the call record to be expanded to include certain release phase information. According to one embodiment of the invention, the compressed call records from the active phase can be expanded and re-created as release phase records capable of completing the release process. When the release phase 230 is completed, the call record is discarded.

Figure 3:
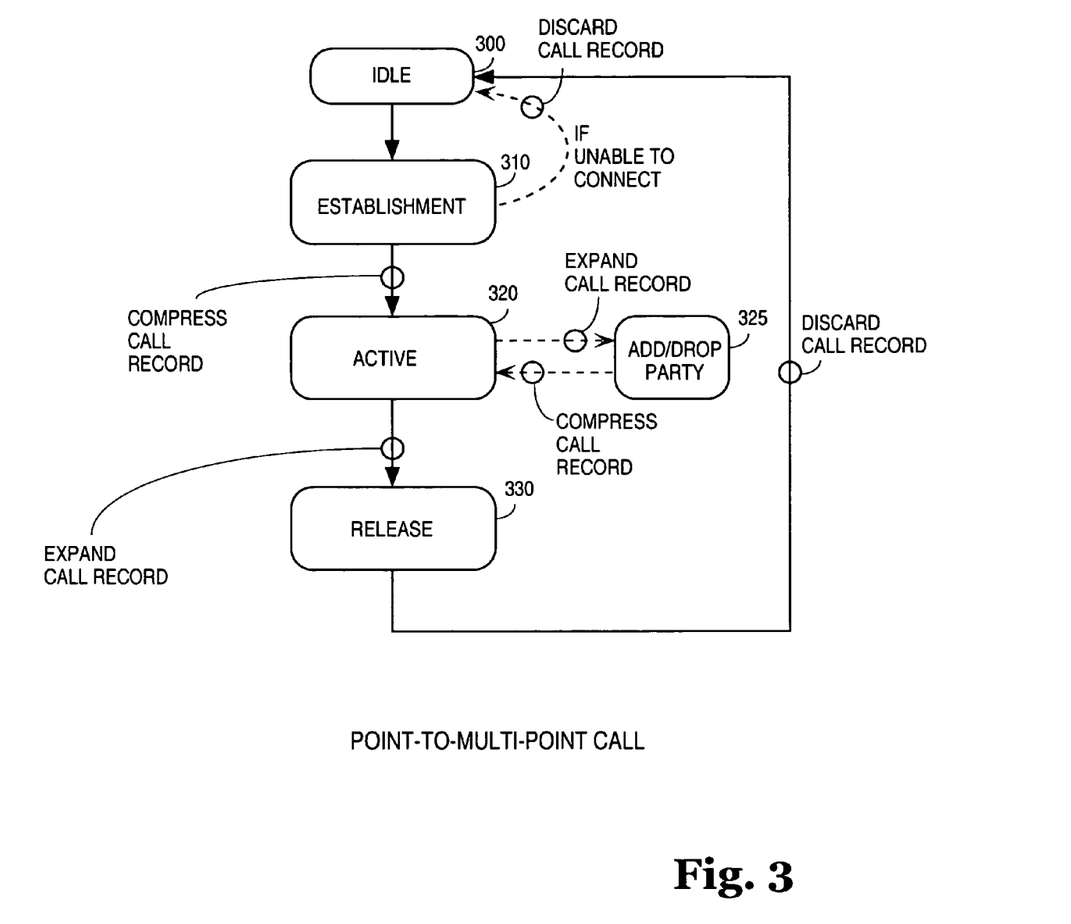
FIG. 3 illustrates the operation of a connection-oriented network point-to-multi-point call with call record management.

FIG. 3 illustrates the operation of a connection-oriented network point-to-multi-point call with call record management.

In a "point-to-multi-point" call, two or more parties are connected together in the same active session. The point-to-multi-point call will have the ability to add or drop new parties as desired, in addition to the two parties participating in the initial call establishment ("call initiating parties"). During the active phase, no additional parties are being added or dropped from the call.

For a given point-to-multi-point call, before a call is established, the call is said to be in an idle state 300. The establishment phase 310 begins with the receipt of a Call Setup message at a particular node. The establishment phase also commences the formation of a new call record for that call as it passes that particular node. Thus, a call that has to traverse through five nodes before being connected would have five call records associated with it, one at the controller of each node. When a call is connected (established) successfully, then that call is first in the active phase 320. As such, the call is no longer "in progress," but rather has been fully established. If a call is unable to connect, then the call transitions directly back to idle state 300 from establishment phase 310. For example a destination busy signal would end the establishment phase 310 and, thus trigger the idle state before the call reaches the active phase. In this instance, the call record is fully discarded.

If a call is in the active phase 320, the transfer of user data (rather than just control/signaling data) can occur until a release (hang-up) is completed. When the call transitions from the establishment phase 310 to the active phase 320, the call record at each node that the call has passed through is updated in selected fields. Certain other fields, which the call record needed to preserve during establishment phase 310, may not needed during the active phase. According to the invention, the call record is compressed by discarding such information when a call reaches the active phase.

In many regards, the active phase for a point-to-multi-point call is similar to the active phase for a point-to-point call. However, unlike a point-to-point call, a point-to-multi-point call is capable of adding (and subsequently dropping) additional parties to the connection. FIG. 3 illustrates this capability by a special intermediary state, the "Add/Drop Party" state 325. When a new party is being added to the call, it is similar to a call establishment. Thus, as shown in FIG. 3, the compressed active phase call record must be temporarily expanded when the add party procedure is initiated. When the add party procedure is completed, the call returns to the active phase, and the call record can again be compressed. A drop party procedure is similar to a call release. Thus, as shown in FIG. 3, the compressed active phase call record must be temporarily expanded when the add party procedure is initiated. When the drop party procedure is completed, the call returns to the active phase, and the call record can again be compressed. In the Add/Drop Party state 325, the call record is expanded to include, as appropriate, information relevant to either an add or drop party proceeding.

The add party situation does not result in the creation of an entirely new call record, but adds to the existing call record. Once the add party is complete, the added party is "active" and thus, the call record can again be compressed. Likewise, when an added party is being dropped, the call record is first expanded and after the completion of the drop party, the call record is once again compressed. A compressed call record after the completion of an add party will have more information than that of a compressed call record after the completion of a drop party.

When the call completes its data transfer or disconnected prematurely by accident or design, the active phase 320 is terminated and the call transitions to a release phase 330. The release phase 330 must be completed before the call is considered to be in the idle state 300 and ordinarily, this requires the call record to be expanded to include certain release phase information. According to one embodiment of the invention, the compressed call records from the active phase can be expanded and re-created as release phase records capable of completing the release process. When the release phase 330 is completed the call record is discarded completely.

Figure 4:
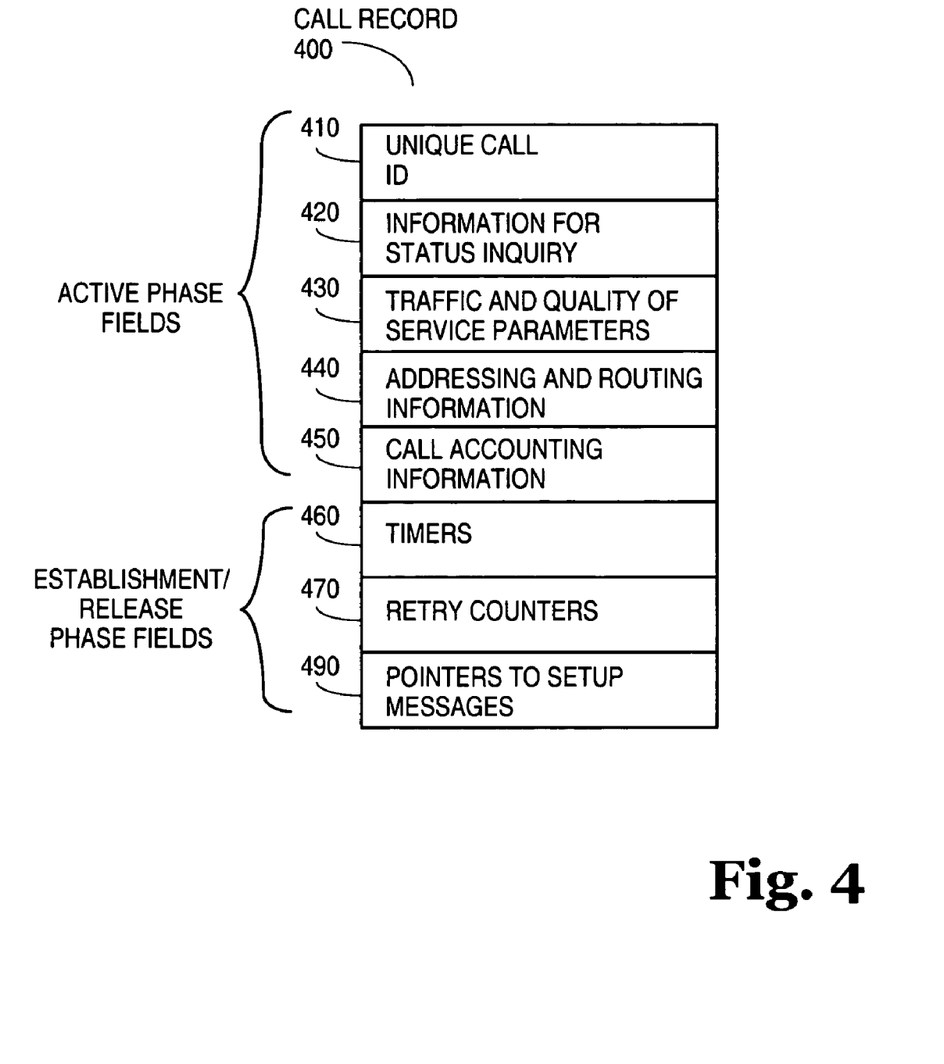
FIG. 4 illustrates a methodology for tracking the aggregate number of calls in the establishment.

FIG. 4 illustrates fields in an exemplary call record.

A typical call record 400 is composed of fields that store particular information about a call. A unique call ID field 410 identifies a call uniquely from any other call on the node. Field 410 is critical for accessing the proper call record for a given call, and thus is maintained throughout all call phases. Also, a field 420 containing information for a status inquiry which indicates the current state of the call (i.e., whether it is being established, already connected and so on). Field established 430 includes traffic and quality of service parameters which define the traffic flow when the call is established. Field 440 includes addressing and routing information in order to trace the path of the call for diagnosis, or to identify where in the network a message for that should be forwarded. A field 450 contains call accounting information, such as the call length or time/date the call was established. Field 460 contains timer information used to determine if a time-out situation has occurred. Field 470 contains retry counters to determine how many times a call set-up retry should be attempted. Field 490 contains pointers to setup messages that are being processed or forwarded by the controller.

According to one embodiment of the invention, fields 460, 470, and 490 may be discarded as soon as a call enters the active phase. The completion of the establishment phase eliminates the need for the information in those fields. By freeing the allocated memory for those fields (rather than merely clearing the fields to null values) extra memory may be made available for other call record storage or other systemic use. By compressing these fields, the call record is compressed. Point-to-point and point-to-multi-point have similar call record structures, with the exception of fields related to added parties dynamically created in the point-to-multi-point call. Such fields include pointers to mini-call records ("child" records of a "root" such as call record 400), which can be added and discarded as a party is added or dropped. When call records are expanded, memory is allocated for fields that are needed for the phase sought to be completed.

Figure 5:
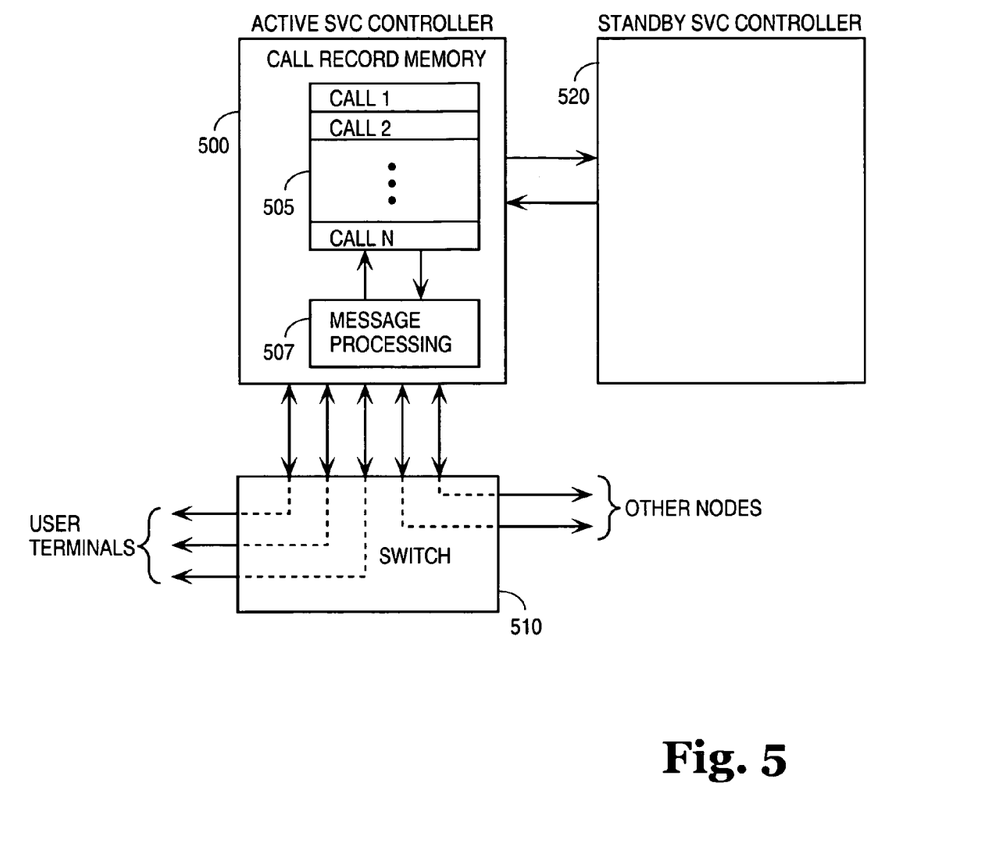
FIG. 5 is a diagram of a system that can use call record management.

FIG. 5 is a diagram of a system that can use call record management.

A network node in a connection-oriented network, such as the nodes shown in FIG. 1, incorporates at least two elements—an active SVC controller 500 and a switch device 510. Such a node may also include a standby SVC controller 520 that takes substitute control of the system when active controller 500 fails to operate as expected. Switch 510 connects to active controller 500 over a number of bi-directional interfaces which pass through switch 510 connecting to either other nodes on the network or to user terminals under the purview of the node in which the switch 510 and controller 500 function. Controller 500 accepts messages over these interfaces which belong to calls that pass through the node. These messages are interpreted and processed by a message processing system 507, which may itself incorporate processors, buffers, protocol stacks and signaling mechanisms, which then initiates action based on the content and directives, if any, contained therein. For instance, when a call setup is successfully processed, a new call record may be created in a call record memory 505 (which may be physically distinct or coalesced with other memories in controller 500 or external to the controller itself (not pictured)). Call record memory 505 is illustrated as containing N call records but this number may be increased as further call setup messages are encountered. Each call record, according to one or more embodiments of the invention, is either in compressed or expanded form, depending upon the phase which the call is entering (or exiting). For instance, when a message indicating a call connect is processed by message processing system 507, controller 500 will compress the call record indicated in the call connect message (by its unique call ID) by removing fields pertinent only to the establishment phase. Likewise, when a disconnect message is processed, the call record is expanded by controller 500 to include release phase related fields. Further, call records can dynamically point to other data structures that store information regarding added or dropped parties in a point-to-multi-point call. As a result of compressing call records and expanding them only as needed, the average size of a call record during its lifetime can be reduced, and thus, the amount of memory restricted for call records can be minimized. Further, in node where a standby controller 520 is used, as in FIG. 5, the amount of bandwidth needed to transfer over call records in the event of a failure would be lower and have the intended advantage of making the process of transferring such records less time consuming, thus allowing the standby controller 520 to go active more rapidly.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method, comprising:
reducing the size of a call record maintained for a call, said reducing in response to said call transitioning from an establishment phase to an active phase, said reducing further comprising discarding timer information from said call record, said timer information used to determine if a time-out situation has occurred.

2. The method of claim 1 wherein said reducing further comprises discarding retry counter information from said call record, said timer retry counter information used to determine how many times a call set-up retry should be attempted.

3. The method of claim 1 wherein said reducing further comprises discarding pointer information from said call record, said pointer information to setup messages that are processed or forwarded by a controller.

4. The method of claim 1 wherein said call is a point-to-point call.

5. The method of claim 1 wherein said call is point-to-multi-point call.

6. The method of claim 5 further comprising expanding said call record during said active phase to include information used to add a party to said call.

7. The method of claim 6 wherein said information further comprises a pointer to a mini-call record.

8. The method of claim 6 further comprising reducing said call record during said active phase in response to said party being added to said call.

9. The method of claim 5 further comprising expanding said call record during said active phase to include information used to drop a party from said call.

10. The method of claim 9 wherein said information further comprises a pointer to a mini-call record.

11. The method of claim 9 further comprising reducing said call record during said active phase in response to said party being dropped from said call.

12. The method of claim 1 wherein said call is transported through an ATM network.

13. A method, comprising:
reducing the size of a call record maintained for a call, said reducing in response to said call transitioning from an establishment phase to an active phase; and,
expanding the size of said call record in response to said call transitioning from said active phase to a release phase.

14. The method of claim 13 wherein said reducing further comprises discarding timer information from said call record, said timer information used to determine if a time-out situation has occurred.

15. The method of claim 13 wherein said reducing further comprises discarding retry counter information from said call record, said timer retry counter information used to determine how many times a call set-up retry should be attempted.

16. The method of claim 13 wherein said reducing further comprises discarding pointer information from said call record, said pointer information to setup messages that are processed or forwarded by a controller.

17. The method of claim 13 wherein said call is a point-to-point call.

18. The method of claim 13 wherein said call is point-to-multi-point call.

19. The method of claim 18 further comprising expanding said call record during said active phase to include information used to add a party to said call.

20. The method of claim 19 wherein said information further comprises a pointer to a mini-call record.

21. The method of claim 19 further comprising reducing said call record during said active phase in response to said party having been added to said call.

22. The method of claim 18 further comprising expanding said call record during said active phase to include information used to drop a party from said call.

23. The method of claim 22 wherein said information further comprises a pointer to a mini-call record.

24. The method of claim 22 further comprising reducing said call record during said active phase in response to said party being dropped from said call.

25. The method of claim 13 wherein said call is transported through an ATM network.

26. An apparatus, comprising:
a) a switch device; and,
b) a switched virtual circuit (SVC) controller that manages memory space where call records are stored for calls that flow through said switch device, said switched virtual circuit (SVC) controller configured to reduce the size of a call record maintained for a call that flows through said switch device, said reducing in response to said call transitioning from an establishment phase to an active phase and wherein said controller is further configured to expand the size of said call record in response to said call transitioning from said active phase to a release phase.

27. The apparatus of claim 26 wherein said controller further comprises a message processing system that receives a messages from said switch, said transitioning capable of being interpreted from said message.

28. The apparatus of claim 26 wherein said call further comprises a call over an ATM network.

29. The apparatus of claim 26 further comprising a standby controller that assumes operation of said controller if said controller fails.

30. The apparatus of claim 26 wherein said apparatus is operating within a working network.

31. An apparatus, comprising:
means for reducing the size of a call record maintained for a point-to-multipoint call, said reducing in response to said call transitioning from an establishment phase to an active phase;
means for expanding said call record during said active phase to include information used to add a party to said call; and means for reducing said call record during said active phase in response to said party being added to said call.

32. The apparatus of claim 31 further comprising means for expanding said call record during said active phase to include information used to drop a second party from said call.

33. The apparatus of claim 32 further comprising means for reducing said call record during said active phase in response to said second party being dropped from said call.

34. The apparatus of claim 31 wherein said call is transported through an ATM network.

35. The apparatus of claim 31 further comprising means for expanding the size of said call record in response to said call transitioning from said active phase to a release phase.

36. An apparatus, comprising:
means for reducing the size of a call record maintained for a point-to-multipoint call, said reducing in response to said call transitioning from an establishment phase to an active phase; and,
means for expanding said call record during said active phase to include information used to drop a party from said call.

37. The apparatus of claim 36 further comprising means for expanding said call record during said active phase to include information used to add a second party to said call.

38. The apparatus of claim 37 further comprising means for reducing said call record during said active phase in response to said second party being added to said call.

39. The apparatus of claim 36 further comprising means for reducing said call record during said active phase in response to said party being dropped from said call.

40. The apparatus of claim 36 wherein said call is transported through an ATM network.

41. The apparatus of claim 36 further comprising means for expanding the size of said call record in response to said call transitioning from said active phase to a release phase.

42. An apparatus, comprising:
means for reducing the size of a call record maintained for a call, said reducing in response to said call transitioning from an establishment phase to an active phase; and
means for expanding the size of said call record in response to said call transitioning from said active phase to a release phase.

43. The apparatus of claim 42 wherein said means for reducing further comprises means for discarding timer information from said call record, said timer information used to determine if a time-out situation has occurred.

44. The apparatus of claim 42 wherein said means for reducing further comprises means for discarding retry counter information from said call record, said timer retry counter information used to determine how many times a call set-up retry should be attempted.

45. The apparatus of claim 42 wherein said means for reducing further comprises means for discarding pointer information from said call record, said pointer information to setup messages that are processed or forwarded by a controller.

46. The apparatus of claim 42 wherein said call is a point-to-point call.

47. The apparatus of claim 42 wherein said call is a point-to-multi-point call.

48. The apparatus of claim 47 further comprising means for expanding said call record during said active phase to include information used to add a party to said call.

49. The apparatus of claim 48 wherein said information further comprises a pointer to a mini-call record.

50. The apparatus of claim 48 further comprising means for reducing said call record during said active phase in response to said party having been added to said call.

51. The apparatus of claim 47 further comprising means for expanding said call record during said active phase to include information used to drop a party from said call.

52. The apparatus of claim 51 wherein said information further comprises a pointer to a mini-call record.

53. The apparatus of claim 51 further comprising means for reducing said call record during said active phase in response to said party being dropped from said call.

54. The apparatus of claim 42 wherein said call is transported through an ATM network.

55. An apparatus, comprising:
a) a switch; and,
b) a readable medium having stored thereon executable instructions and a memory and processor, said executable instructions and memory and processor for maintaining a call record for a call that flows through said switch, said maintaining a call record further comprising reducing the size of said call record in response to said call transitioning from an establishment phase to an active phase, said maintaining a call record also comprising expanding the size of said call record during said active phase to include information used to add a party to said call when said call is a point-to-multipoint call, said maintaining a call record also comprising expanding the size of said call record during said active phase to include information used to drop said party from said call.

56. The apparatus of claim 55 wherein said maintaining further comprises expanding the size of said call record in response to said call transitioning from said active phase to a release phase.

57. The apparatus of claim 55 further comprising a message processing system of which said processor is a part, said message processing system coupled to said switch through a bi-directional interface to transport a message from said switch to said message processing system, a call transitioning capable of being interpreted from said message.

58. The apparatus of claim 55 wherein said call further comprises a call over an ATM network.

59. The apparatus of claim 55 wherein said call record comprises a call ID before and after said reducing.

60. The apparatus of claim 55 wherein said call record further comprises quality of service parameters before and after said reducing.

61. The apparatus of claim 55 wherein said maintaining further comprises reducing the size of said call record during said active phase as a consequence of said party being dropped from said call.

62. An article of manufacture comprising a computer readable medium having instructions which when executed by a computing system perform a method, said method comprising:
reducing the size of a call record maintained for a call, said reducing in response to said call transitioning from an establishment phase to an active phase, said reducing comprising discarding timer information from said call record, said timer information used to determine if a time-out situation has occurred.

63. The article of manufacture of claim 62 wherein said reducing further comprises discarding retry counter information from said call record, said timer retry counter information used to determine how many times a call set-up retry should be attempted.

64. The article of manufacture of claim 62 wherein said reducing further comprises discarding pointer information from said call record, said pointer information to setup messages that are processed or forwarded by a controller.

65. The article of manufacture of claim 62 wherein said call is a point-to-point call.

66. The article of manufacture of claim 62 wherein said call is point-to-multi-point call.

67. The article of manufacture of claim 66 wherein said method further comprises expanding said call record during said active phase to include information used to add a party to said call.

68. The article of manufacture of claim 67 wherein said information further comprises a pointer to a mini-call record.

69. The article of manufacture of claim 67 wherein said method further comprises reducing said call record during said active phase in response to said party being added to said call.

70. The article of manufacture of claim 66 wherein said method further comprises expanding said call record during said active phase to include information used to drop a party from said call.

71. The article of manufacture of claim 70 wherein said information further comprises a pointer to a mini-call record.

72. The article of manufacture of claim 70 further comprising reducing said call record during said active phase in response to said party being dropped from said call.

73. The article of manufacture of claim 70 wherein said call is transported through an ATM network.

74. An article of manufacture comprising a computer readable medium having instructions which when executed by a computing system perform a method, said method comprising:
reducing the size of a call record maintained for a call, said reducing in response to said call transitioning from an establishment phase to an active phase; and,
expanding the size of said call record in response to said call transitioning from said active phase to a release phase.

75. The article of manufacture of claim 74 wherein said reducing further comprises discarding timer information from said call record, said timer information used to determine if a time-out situation has occurred.

76. The article of manufacture of claim 74 wherein said reducing further comprises discarding retry counter information from said call record, said timer retry counter information used to determine how many times a call set-up retry should be attempted.

77. The article of manufacture of claim 74 wherein said reducing further comprises discarding pointer information from said call record, said pointer information to setup messages that are processed or forwarded by a controller.

78. The article of manufacture of claim 74 wherein said call is a point-to-point call.

79. The article of manufacture of claim 74 wherein said call is point-to-multi-point call.

80. The article of manufacture of claim 79 wherein said method further comprises expanding said call record during said active phase to include information used to add a party to said call.

81. The article of manufacture of claim 80 wherein said information further comprises a pointer to a mini-call record.

82. The article of manufacture of claim 80 wherein said method further comprises reducing said call record during said active phase in response to said party having been added to said call.

83. The article of manufacture of claim 79 wherein said method further comprises expanding said call record during said active phase to include information used to drop a party from said call.

84. The article of manufacture of claim 83 wherein said information further comprises a pointer to a mini-call record.

85. The article of manufacture of claim 83 wherein said method further comprises reducing said call record during said active phase in response to said party being dropped from said call.

86. The article of manufacture of claim 74 wherein said call is transported through an ATM network.

\* \* \* \* \*